(12) United States Patent
Spielvogel et al.

(10) Patent No.: US 11,376,941 B2
(45) Date of Patent: Jul. 5, 2022

(54) ELECTRIC VEHICLE BATTERY COOLING STRUCTURE

(71) Applicant: MUBEA CARBO TECH GMBH, Salzburg (AT)

(72) Inventors: Bernhard Spielvogel, Moosbach (AT); Sebastian Schmitz, Salzburg (AT); Guido Insam, Kalsdorf (AT); Herbert Dorfinger, Zell am Moos (AT)

(73) Assignee: MUBEA CARBO TECH GMBH, Salzburg (AT)

(*) Notice: Subject to any disclaimer, the term of this patent is extended or adjusted under 35 U.S.C. 154(b) by 178 days.

(21) Appl. No.: 16/605,773

(22) PCT Filed: May 3, 2018

(86) PCT No.: PCT/EP2018/061425
§ 371 (c)(1),
(2) Date: Oct. 16, 2019

(87) PCT Pub. No.: WO2018/202813
PCT Pub. Date: Nov. 8, 2018

(65) Prior Publication Data
US 2021/0138886 A1      May 13, 2021

(30) Foreign Application Priority Data

May 5, 2017  (CH) .................................... 00604/17

(51) Int. Cl.
*B60K 1/04*      (2019.01)
*H01M 10/613*    (2014.01)
(Continued)

(52) U.S. Cl.
CPC ................ *B60K 1/04* (2013.01); *B60R 16/04* (2013.01); *F28F 1/022* (2013.01); *F28F 3/12* (2013.01);
(Continued)

(58) Field of Classification Search
CPC .................................. B60K 1/04; H01M 50/20
See application file for complete search history.

(56) References Cited

U.S. PATENT DOCUMENTS

| 4,600,802 A * | 7/1986 | Ihas | .......................... H01R 4/68 |
| | | | 174/15.4 |
| 2012/0103714 A1* | 5/2012 | Choi | ...................... H01M 50/20 |
| | | | 180/68.5 |

(Continued)

FOREIGN PATENT DOCUMENTS

| CN | 1485942 A | 3/2004 |
| CN | 102881957 A | 1/2013 |

(Continued)

OTHER PUBLICATIONS

International Search Report (ISR) and Written Opinion for PCT/EP2018/061425 dated Nov. 14, 2018, pp. 1-17.

(Continued)

*Primary Examiner* — Jonathan Ng
*Assistant Examiner* — James J Triggs
(74) *Attorney, Agent, or Firm* — GrowIP Law Group LLC (57) ABSTRACT

The invention is directed to a support structure for an energy storage device, in particular for a battery pack of a vehicle that has at least one base panel which has a first surface and a second surface and that is at least partially made from a composite material. At least one thermal transfer member is arranged on the first surface of the least one base panel. The thermal transfer member comprises at least one contact face configured to be in thermal contact with at least part of an energy storage device to be mounted on the support structure.

37 Claims, 8 Drawing Sheets

(51) Int. Cl.
H01M 10/625 (2014.01)
H01M 10/6556 (2014.01)
H01M 50/20 (2021.01)
B60R 16/04 (2006.01)
F28F 1/02 (2006.01)
F28F 3/12 (2006.01)
B60K 1/00 (2006.01)

(52) U.S. Cl.
CPC ....... H01M 10/613 (2015.04); H01M 10/625 (2015.04); H01M 10/6556 (2015.04); H01M 50/20 (2021.01); B60K 2001/005 (2013.01); H01M 2220/20 (2013.01)

(56) References Cited

U.S. PATENT DOCUMENTS

2012/0312614 A1  12/2012  Fujiwara et al.
2013/0004822 A1* 1/2013  Hashimoto ....... H01M 10/6554
                                                    429/120
2015/0135939 A1  5/2015  Rawlinson
2016/0023688 A1  1/2016  Berger et al.

FOREIGN PATENT DOCUMENTS

| | | |
|---|---|---|
| CN | 103178311 A | 6/2013 |
| CN | 103201870 A | 7/2013 |
| CN | 103238250 A | 8/2013 |
| DE | 102010024320 A1 | 12/2011 |
| DE | 102010032898 A1 | 2/2012 |
| EP | 0681156 A1 | 11/1995 |
| JP | 08210793 A | 8/1996 |
| WO | 2004031677 A1 | 4/2004 |
| WO | 2012118015 A1 | 9/2012 |
| WO | 2016109881 A1 | 7/2016 |

OTHER PUBLICATIONS

Search Report and First Office Action for Chinese Application No. 201880019600.9 dated Jul. 24, 2020.

* cited by examiner

ELECTRIC VEHICLE BATTERY COOLING STRUCTURE

CROSS-REFERENCE TO RELATED APPLICATIONS

This application claims the benefit of priority of international PCT Patent Application No. PCT/EP2018/061425, filed on May 3, 2018 that in turn claims priority to Swiss Patent Application No. CH 00604/17, filed on May 5, 2017, the contents of which are hereby incorporated by reference in their entirety.

FIELD OF THE INVENTION

The present disclosure relates to a support structure for an energy storage device, preferably for a battery of an electric vehicle. The present disclosure also relates to a thermal transfer member for such a support structure. The present disclosure further also relates to a method for producing such a support structure, a power module comprising such a support structure and to an electric vehicle comprising such a support structure.

BACKGROUND OF THE INVENTION

From the prior art, different types of cases for battery packs for electric vehicles are known.

US2016023688A by Porsche A G was published on 10 Oct. 2017 and discloses an underbody unit for a motor vehicle body, which has a floor body connectable to the motor vehicle body for dissipating static and/or dynamic loads. Reinforcing ribs protrude up from the floor body. The reinforcing ribs together with the floor body delimit receiving pockets for receiving battery cell units of a traction battery for driving the motor vehicle. First and second connections supply and remove a liquid cooling medium for cooling the floor body. The battery cell units are above the floor body and can be inserted into the underbody unit. Thus, the underbody unit, the reinforcing ribs and the connections for the coolant define a supporting plate that can support the heavy battery cell units, form armor plating for protection and a heat exchanger for active and/or passive cooling.

US2015135939A by Atieva Inc. was published on 21 May 2015 and describes a battery pack protection system which is provided for use with an electric vehicle in which the battery pack is mounted under the car. The system utilizes a plurality of deformable cooling conduits located between the lower surface of the batteries within the battery pack and the lower battery pack enclosure panel. The cooling conduits are configured to deform and absorb impact energy when an object, such as road debris, strikes the lower surface of the lower battery pack enclosure panel. Further protection may be achieved by positioning a ballistic shield, alone or with a layer of compressible material, under the second surface of the battery pack.

US2012312614A by Honda Motor Co Ltd. was published on 26 Mar. 2013 and discloses a power supply apparatus which includes a plurality of battery modules, a support plate, a plurality of first reinforcing projections and a plurality of second reinforcing projections. The support plate supports the battery modules and includes a first plate and a second plate. The first plate thermally contacts second surfaces of the battery modules. The second plate is placed on a second surface of the first plate to define cooling spaces between the first and second plates. A coolant is to flow in the cooling spaces.

DE102010024320A1 by Audi AG was published on 22 Dec. 2011 and discloses a device which has a holding unit attached to a supporting structure. The holding unit is formed with several layers. The holding unit is designed as a sandwich component with a plate-like top layer and a plate-like bottom layer. An energy absorption layer is formed between the top layer and the bottom layer. A battery faces the plate-like top layer, where the plate-like top layer is designed as a cooling device. The top layer comprises a cooling passage for formation of the cooling device. The energy absorption layer is made of resilient material.

SUMMARY OF THE INVENTION

The overall performance of electric vehicles is closely dependent on the efficiency of the energy storage devices present in these vehicles. Within the context of the present disclosure, energy storage devices in particular include battery packs and supercapacitors. Nevertheless, the present disclosure is not limited to being used for these types of energy storage devices. However, in order to provide a concise description of the invention, it will be described mainly for use with battery packs.

Being electrochemical systems, conventional battery packs are highly dependent on the operating temperature range. Temperature affects directly the power and energy provided by the battery pack, as well as its charging behavior. Consequently, operation of a battery pack within a specific temperature range is essential for the total efficiency of a battery pack, as well as for device safety and reliability. Therefore, there is a need for competent systems that allows the temperature of a battery pack to be maintained in an optimum or at least tolerable range. Most of the time such systems will be used for cooling of a battery pack, respectively via removal of thermal energy from a battery pack. Such mode of operation will typically be applied during driving of a vehicle or charging of a battery pack. However, systems for temperature regulations may also be used to heat a battery pack, respectively to maintain a minimal temperature. Such a mode of operation may be applied in cold regions in order to improve driving range and charging performance. In order to allow capable cooling and/or heating of a battery pack, efficient transfer of thermal energy between a system for thermal control and a battery pack is required.

At the same time such a system for thermoregulation must not impair vehicle safety. On the one hand, intrusion of coolant (if present) into the battery pack has to be ruled out in order to prevent short-circuits and other types of damage to the battery. On the other hand, a system for thermoregulation must not negatively interfere with the structural integrity and mechanical safety of a battery pack. Battery packs usually occupy a substantial part of an electric vehicle's underbody area, where they are prone to damage not only from frontal, posterior and lateral impacts but also from impacts from below. Such impacts may result from unevenness in the road surface and debris but may, e.g., also be caused by accidentally rising retractable bollards. Mechanical impacts to the mechanically sensitive and expensive battery packs cannot only cause expensive damage, but may also be very dangerous for passengers due to the high energy density present in these devices. Therefore, in order to bear and protect battery packs in electric vehicles, mechanically competent support structures, as well as underfloor shields, are required. Nevertheless, the systems known in the prior art typically account for a substantial fraction of a vehicle's total mass, as do the battery packs. Hence, the solutions known for energy storage significantly contribute to the total weight of electric vehicles which hence affects the energy economy of electric vehicles. At the same time complexity of assembly and disassembly of an electric vehicle has to be minimized and replacement and/or maintenance of a battery pack has to be quick and straightforward.

Therefore, systems for support and/or thermoregulation and/or protection of battery packs are needed which are compact, light and can be easily integrated within the vehicle structure, in particular the vehicle underbody.

A support structure for an energy storage device, in particular for a battery pack of a vehicle according to the present disclosure typically comprises at least one base panel that has a first surface and a second surface and that is at least partially made from a composite material. The base panel may be an essentially flat panel, but may also have a curvature. Thus, the base panel may e.g. comprise a shell-like structure. The support structure also comprises at least one thermal transfer member arranged on the first surface of the least one base panel, as will be explained in more detail below. The thermal transfer member comprises at least one contact face configured to be in thermal contact with at least part of an energy storage device to be mounted on the support structure. Typically, the contact face will be in direct physical contact with at least one corresponding contact face of, e.g., a battery pack. However, a contact agent (such as an adhesive) may also be arranged between the contact face and the thermal storage device in order to improve thermal transfer between the thermal transfer member and the energy storage device.

Hence, compared to the systems known in the prior art, such a support structure can be regarded as an integral but still hybrid structure having a compact and lightweight design. The thermal transfer member may be designed such that it mechanically interacts with the base panel in order to increase the mechanical competence (e.g. strength and stiffness) of the support structure by influencing the load paths in the total structure and to obtain a more balanced loading.

A mechanically competent and particularly lightweight structure may be obtained if the at least one base panel is at least partially made from a fiber reinforced plastic. As such, fiber reinforced plastics comprising, e.g., glass fibers, carbon fibers, aramid fibers, basalt fibers or combinations thereof may be used. The base panel may comprise one or multiple fastening points integrally made with the base panel in order to mechanically interconnect the support structure with the chassis/frame of a vehicle.

In order to increase vehicle safety, the base panel may comprise a layer of fibers adjacent to the first surface which comprises glass fibers and/or a layer of fibers adjacent to the second surface which comprises glass fibers. Such a layer of glass fibers will typically change its visual appearance when being mechanically loaded above a certain level and hence can be used as a damage indicating mechanism in order to reveal a potentially harmful incident which may have caused damage in underlying material while the material visible from outside stayed intact. As a consequence, the support structure could be tested in order to verify its structural integrity.

Alternatively or in addition, a layer of glass fibers may also be used for electrical decoupling of the base panel and the thermal transfer member and/or the chassis/frame of a vehicle in order to prevent corrosion phenomena and/or increase passenger safety.

Alternatively or in addition, the base panel may comprise at least one layer of aramid fibers. Thus, a support structure having a particularly high mechanical impact tolerance can be obtained.

A particularly lightweight support structure may be obtained if the base panel comprises a sandwich-type panel comprising a panel core and a first cover sheet and a second cover sheet arranged on two opposite sides of the panel core. Thus, the mechanical resistance of the support structure against impacts from below can be significantly increased. In a variation of the invention, the thermal transfer member may be at least part of the first cover sheet. In addition, for certain applications using a base panel comprising a sandwich-like panel will help to improve thermoregulation as such panels usually have thermal insulating properties, and hence, thermal transfer between the thermal transfer member and the base panel can be minimized. This in particular holds true if the panel core is made from a thermal insulation material, e.g. a cellular solid. Particularly good results for certain applications may be obtained if the thermal conductivity of the base plate, namely the panel core (if present) of the base plate, is between 0.02 and 0.1 W/(m K) [watts per meter per Kelvin].

In a variation of the invention, the heat transfer member can be regarded as being at least part of an upper cover sheet of a sandwich panel.

A mechanically highly competent support structure may be obtained if the panel core comprises a cellular solid material. Good results may be obtained if the panel core is at least partially made from a foam material. In particular using a polymethacrylimide (PMI) foam can be used to improve impact performance. Particularly good results may be obtained if a PMI foam (expanded PM I) with a density of less than about 150 kg/m³ [kilogram per cubic meter] is applied. Alternatively or in addition, another type of cellular solid, such as a honeycomb structure may be used. For certain applications, the panel core may also comprise a metal foam, such as an aluminum foam.

Alternatively or in addition, the base panel may comprise at least one monolithic beam that increases the stiffness and/or strength of the base panel. In particular the tolerance for frontal, posterior and lateral impacts can be increased by using at least one monolithic beam. Using a sandwich-type base panel, a monolithic beam may be arranged between the first and the second surface of the base panel or at least partially on the second/first surface.

In order to be interconnected with the chassis/frame of a vehicle, or, e.g., to mount an energy storage device, the base panel may comprise at least one insert that is at least partially arranged/embedded in the base panel for use as a fastening point, respectively for mechanical load transfer. Alternatively or in addition, the at least one insert may be used for electrical bonding. A variation of a support structure that has a particularly compact design may be obtained if the first surface of the base panel comprises at least one recess in which the at least one thermal transfer member is at least partially arranged, as will be explained in more detail below.

For some applications, an intermediate layer may be arranged between the first surface and the thermal transfer member. Such an intermediate layer may also be regarded as a transition layer. The intermediate layer may comprise an adhesive agent in order to mechanically interconnect the base panel with the thermal transfer means.

The durability of a support structure may be increased if the intermediate layer is made from an elastic material. In particular from a material that has a lower elastic modulus than the thermal transfer member. Thus differing degrees of thermal expansion of the thermal transfer member and the base panel can be compensated and hence critical thermal stress may be prevented. In addition, the intermediate layer may be used to influence load transfer from the thermal transfer member to the base panel, e.g. by levelling out local stress concentration. Good results may be obtained if the thickness of the intermediate layer is between 0.2 mm and 1.5 mm. Thus, advantageous load transfer, as well as good compensation of thermal stress, can be obtained for a wide field of applications. However, for some applications the thickness of the intermediate layer may also be between 1.5 mm and 3 mm, in order to obtain balanced load transfer. Intermediate layers with other thicknesses are possible. Alternatively or in addition, an intermediate layer may also be used for electrochemical decoupling in order to prevent or at least reduce corrosion phenomena, in particular for variations of the invention having thermal transfer members at least partially made from aluminum and base panels comprising carbon fibers. Alternatively or in addition, the intermediate layer may be configured to provide thermal insulation.

Good thermal transfer between a battery pack and a thermal transfer member may be obtained if the at least one thermal transfer member is plate-shaped, as will be explained in more detail below.

Highly efficient thermoregulation may be obtained if the at least one thermal transfer member is at least partially made from a metal. Particularly good results may be obtained if the thermal transfer member is at least partially made from aluminum or copper. In order to increase thermal transfer, the thermal transfer member may comprise protrusion like ribs to increase the area of the contact face to be in thermal contact with an energy storage device. For certain applications, the thermal transfer member may be at least partially made from a short fiber reinforced plastic.

In a variation of the invention, multiple thermal transfer members are arranged on the first surface of the base panel. The thermal transfer members may be arranged a distance apart from each other or may be arranged adjacent to each other. They may be mechanically interconnected with each other, such as by snap-in connections, e.g. tongue and groove connections.

Efficient long-term thermal transfer allowing steady state operation of an electric vehicle may be obtained if the at least one thermal transfer member comprises at least one internal channel configured to receive and move a coolant, respectively a cooling fluid such as a liquid or a gas. The thermal transfer member may comprise multiple internal channels that are fluidically interconnected or at least temporarily separated from each other.

The at least one internal channel may be configured such that turbulent flow of the coolant when moved in the channel is obtained. Thus, thermal transfer may be increased.

The at least one internal channel may be configured such that laminar flow of the coolant when moved in the channel is obtained. Thus, for certain types of vehicles lightweight low performance coolant pumps may be applied, allowing a decrease in the total vehicle weight.

For some applications, at least one main beam may be mechanically interconnected with the base panel. A main beam may be arranged at the edges, respectively boundary regions, of the base panel. Alternatively or in addition, a main beam may also be arranged on the first surface and at the center region of the base panel. Thus, the mechanical competence of the support structure in case of impacts can be improved, as will be explained in more details below.

In a variation of the invention, the base panel has an essentially rectangular shape and comprises a first main beam mechanically interconnected with and extending along a first edge area of the base panel and a second main beam mechanically interconnected with and extending along a second edge area of the base panel.

A particularly lightweight support structure can be obtained if the at least one main beam is an integral part of the base panel. Hence, the at least one main beam and the base panel may be integrally made, e.g. from a fiber reinforced plastic. If the support structure comprises multiple main beams, multiple or all of them may be integrally made with the base panel.

Alternatively or in addition, at least one main beam may be a separately produced part that is mechanically interconnected with the base panel and/or another main beam (if present). Such a mechanical interconnection may be obtained by a fastening means, such as an adhesive agent, bolt, tongue and groove connection, screw or combinations thereof. In addition, positive locking may be established during production of the base panel. Hence, a mechanically highly competent and relatively cost-efficient support structure may be obtained.

Particularly, economic variations of a support structure may be obtained if the support structure, namely at least one main beam, comprises an extruded profile at least partially made from a metal and/or at least partially made from a short fiber reinforced plastic. Particularly good results may be obtained if a lightweight metal is used, such as aluminum, magnesium or titanium. For some applications, crash performance of the support structure may be increased if the at least one main beam comprises a hollow profile that may be empty or be at least partially filled, e.g. with a cellular solid.

In a variation of the invention, the support structure comprises a first auxiliary beam and a second auxiliary beam mechanically interconnected with and forming a frame with the first and the second main beam, as will be explained in more detail below. The main and auxiliary beams may be integrally made, hence form an integral frame or be part of an integral frame. The auxiliary beams may be mechanically interconnected with the base panel. The auxiliary beams may be extruded profiles made from a metal or from a short fiber reinforced plastic, as a main beam. A frame, respectively framework, as described above may be assembled independent from the floor panel, which will allow particularly cost efficient production.

In a variation of the invention, at least one rib is arranged between the first and the second main beam and/or between the first and the second auxiliary beam. Hence, the mechanical competence of the support structure may be further increased.

For some applications, the support structure may comprise at least one cover member releasably mechanically interconnected with the base panel and enclosing at least one housing compartment configured to receive at least one energy storage device. The cover member may have a shell-like or pan-shaped design, as will be shown in more detail below. Between the cover member and the base panel and/or the thermal transfer member a sealing means may be arranged in order to prevent intrusion of liquids or dust into the housing compartment.

In a variation of the invention, the cover member comprises a cover framework made at least partially from a fiber reinforced plastic. Thus, a mechanically highly competent, and at the same time lightweight support structure, can be obtained. Good results may be obtained if the cover member comprises a sandwich-type structure, embodied as described with respect to the base panel and beams herein.

The cover member may comprise a cover closure made from a fiber reinforced plastic that may be separable from a cover framework or be an integral part of a cover framework.

Vehicle safety may be increased if the thermal transfer member comprises at least one inlet port and at least one outlet port interconnected with each other via at least one internal channel and configured to be interconnected with a cooling circuit, the at least one inlet port and the at least one outlet port being arranged outside of the at least one housing compartment. Hence intrusion of coolant into a battery pack arranged in the cover housing can be prevented because potentially leaking connectors of a cooling circuit are arranged outside of the housing compartment.

In a variation of the invention the support structure comprises at least one passage 20 that extends from the second surface of the base panel via the base panel to a first surface of a cover member. Such a variation of a support structure may allow easy installation in an electric vehicle from below the vehicle.

The present disclosure is also directed to a thermal transfer member for a support structure that may be used in order to obtain a very versatile support structure as described above, but may also be viewed as an independent inventive concept, independent of the aforementioned support structure. Such a thermal transfer member typically comprises a contacting unit which has a contact face configured to be brought into contact with an energy storage device and a multiplicity of internal channels arranged inside of the contacting unit, each internal channel fluidically interconnecting at least two channel ports arranged at the surface of the contacting unit. The thermal transfer member further comprises a routing module that has at least one inlet port for receiving a thermal transfer fluid (e.g. coolant) and at least one outlet port for dispensing the thermal transfer fluid. The routing module is fluidically interconnected with the channel ports of the internal channels whereby it defines/effects at least one fluidic pathway that fluidically interconnects the at least one router inlet port with the at least one router outlet port via at least one internal channel.

A very economical thermal transfer member may be obtained if a first fraction of the channel ports is arranged at a first connection face and a second fraction of the channel ports is arranged at a second connection face of the contacting unit and wherein the routing module comprises first routing member and a second routing member, the first routing member being arranged at the first connection face and being fluidically interconnected with the first fraction of the channel ports and the second routing member being arranged at the second connection face and being fluidically interconnected with the second fraction of the channel ports. Thus, a contacting unit with a relatively simple design that can be produced, e.g., by an extrusion process, allows a large variety of different thermal transfer members to be obtained, as will be explained in more detail below. This in particular holds true if the contacting unit comprises a plate-like structure. Particularly if the plate-like structure has an essentially rectangular shape. Good results may be obtained if the plate-like structure has a thickness of about between 3 mm and 8 mm, in particular of about 4 mm.

For some types of coolants, efficient cooling may be obtained if the internal channels have an essentially rectangular cross-section with a height of about 2 mm and a width of about 11.5 mm.

The contacting unit may be an extruded profile, such as an extruded aluminum profile.

In a variation of the invention, the contacting unit and the routing module are separately made and then mechanically interconnected with each other such as by soldering, welding, use of an adhesive agent or other type of connection. In a variation of the invention, the contacting unit and the routing module are integrally made. For some applications, the contacting unit and/or the routing module may be at least partially made by a 3D-printing method. Hence highly application-specific (i.e., energy storage device specific) thermoregulation may be obtained.

A specific fluidic pathway may be obtained if the routing module comprises at least one routing cavity that is fluidically interconnected with at least two channel ports when the routing module is interconnected with the contacting unit, as will be explained in more detail below. Multiple routing cavities may be used. For some applications, a first and a second member may be used, both having essentially identical designs, as will be shown below. Thus, a particularly economic thermal transfer member may be obtained.

The present disclosure is also directed to a method to produce a support structure as described above. Such a method comprises the method steps of
  a. providing a tool;
  b. applying layers of fibers to the tool;
  c. applying at least one thermal transfer member to the layers of fibers;
  d. bonding the fibers by a resin to form a composite material.

In order to obtain certain variations of a support structure, the method may also comprise the step of applying an intermediate layer between the layers of fibers and the at least one thermal transfer member.

The present disclosure is also directed to a power module comprising a support structure and an energy storage device as described herein.

The present disclosure is also directed to an electric vehicle comprising a support structure as described herein.

Within the context of the present disclosure, "aluminum", "magnesium", "titanium" and "copper" should be understood as meaning also their alloys.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described invention will be more fully understood from the detailed description given herein below and the accompanying drawings which should not be considered limiting to the invention described in the appended claims. The drawings are showing schematically:

DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be understood as limited to the embodiments set forth herein; rather, these embodiments are provided so that this disclosure will satisfy applicable legal requirements. Whenever possible, like reference numbers will be used to refer to like components or parts.

Figure 1:
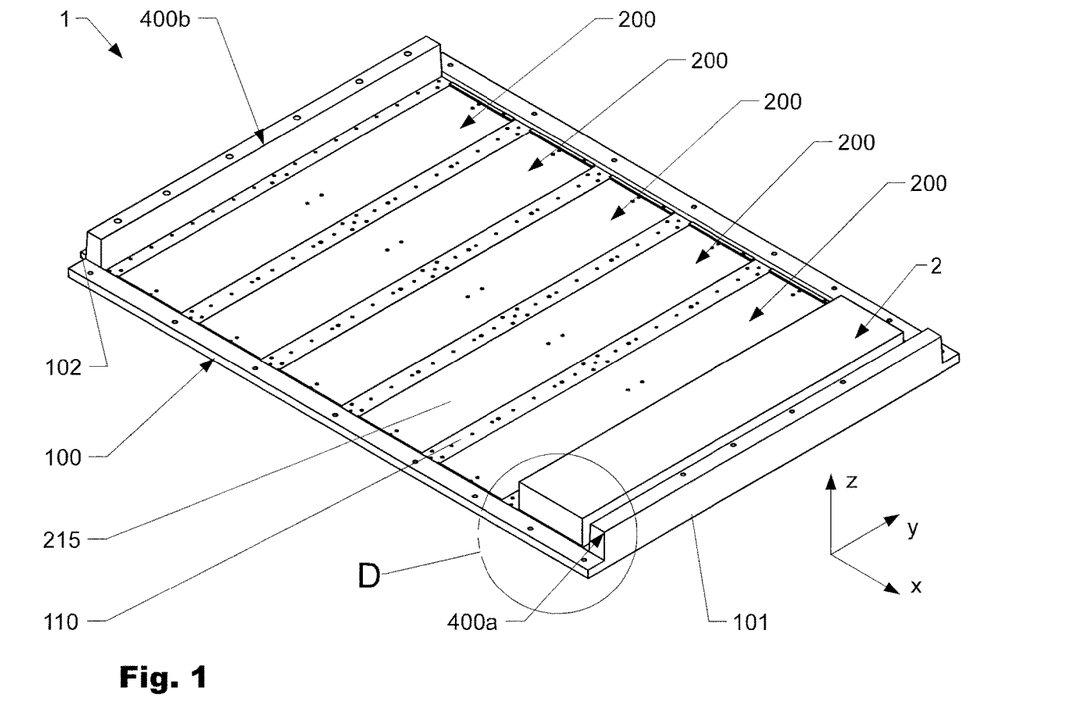
FIG. 1 a first variation of a support structure according to the present disclosure with a battery pack in a perspective view from above.
Figure 2:
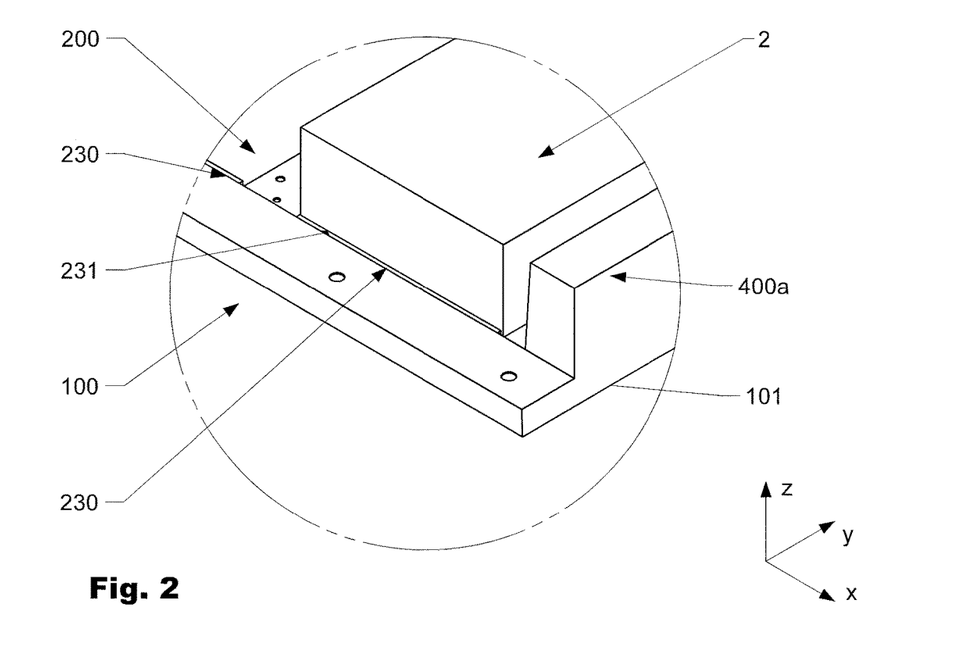
FIG. 2 detail D of FIG. 1.
Figure 3:
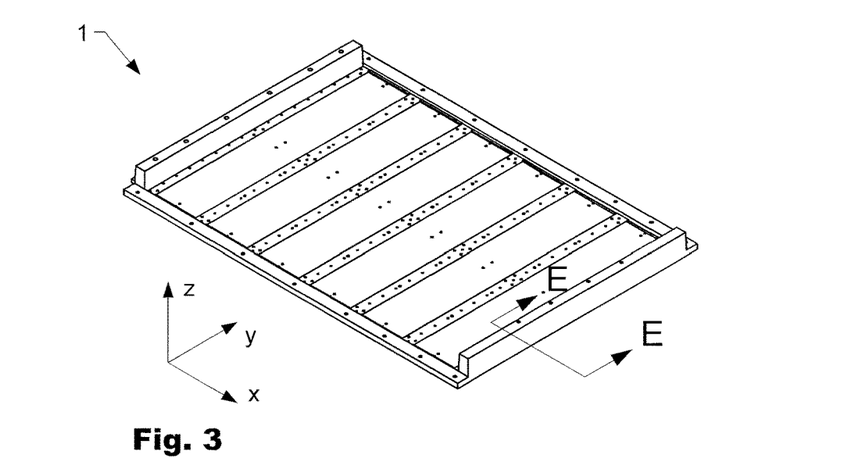
FIG. 3 the variation of a support structure of FIG. 1.
Figure 4:
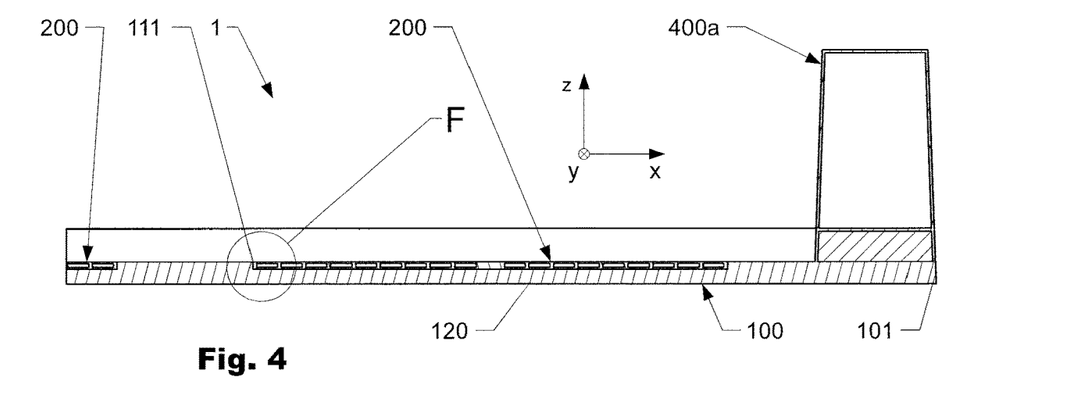
FIG. 4 cross-section EE of FIG. 3.
Figure 5:
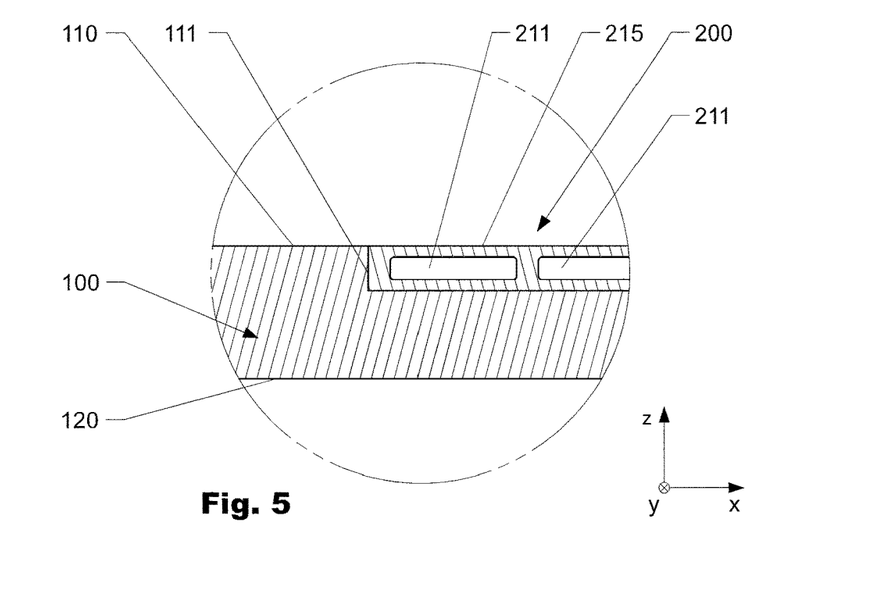
FIG. 5 detail F of FIG. 4.

FIGS. 1 to 4 show a first variation of a support structure 1 according to the present disclosure. The support structure 1 comprises a base panel 100 which is partially made from a fiber reinforced plastic. The support structure 1 further comprises an assembly of multiple thermal transfer members 200 that are arranged on a first surface 110 of the base plate 100. A contact face 215 is arranged on the top of each thermal transfer member 200, configured such that an energy storage device 2 can be arranged on the contact face 215 such that the thermal transfer member 200 is in thermal contact with the battery pack 2 arranged on the thermal transfer member 200. The support structure further 1 comprises a first main beam 400a that is mechanically interconnected with and extending along a first edge area 101 of the base panel 100. In addition, the support structure further 1 comprises a second main beam 400b that is mechanically interconnected with and extending along a second edge area 102 of the base panel 100. The first and the second main beam 400a,b are both made from a composite material and increase the total mechanical competence of the base panel 100. In addition, they act as impact absorbing means in case of collisions in direction of the x-axis. Hence damage of battery pack 2 in case of a traffic accident can be prevented or at least significantly reduced. As schematically indicated in FIG. 4, the main beams 400a,b of the variation of a support structure 1 shown are integral parts of the base panel 100, the base panel 100 and main beams 400a,b being made from a fiber reinforced plastic and produced by means of a resin transfer molding (RTM) process. As schematically shown in FIG. 4, the first surface 110 of the base panel 100 comprises recesses 111 in which the thermal transfer members 200 are arranged. The variation of a thermal transfer member 200 shown is an extruded profile and comprises internal channels 211 in which a coolant (not shown) can flow in order to decrease or increase the thermal energy in the thermal transfer member 200. Hence, temperature of a battery pack 2 arranged on the contact face 215 of the thermal transfer member 200 can be decreased and/or increased, depending on the temperature of the coolant that flows in the internal channels 211. In order to allow high thermal conduction, the variation of a thermal transfer member 200 shown is made from aluminum. The variation of a base panel 100 shown in FIGS. 1 to 4 is made from a composite material comprising multiple layers of a fiber reinforced plastic material, whereby the layers of fibers adjacent to the second surface 120 of the base panel 200 are made from a material that has a high resistance against chemical and mechanical impact, such as glass and/or aramid.

Figure 6:
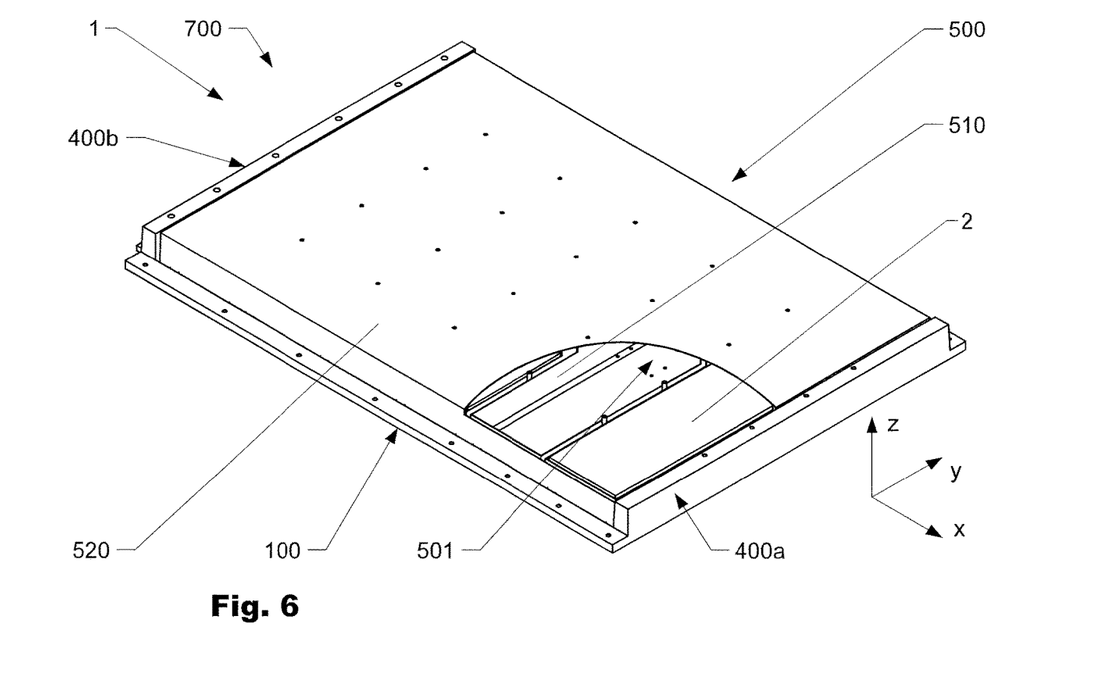
FIG. 6 a second variation of a support structure according to the present disclosure comprising a cover member, with a battery pack in a perspective view from above, part of a cover closure being clipped for illustrative purposes.

FIG. 6 shows a variation of a support structure 1 that comprises a base plate 1 as described with respect to FIGS. 1 to 4, as well as cover member 500 that can be releasably mechanically interconnected with the base panel 100. The cover member 500 comprises on its top a cover closure 520 which in FIG. 6 has been partly removed for illustrative purposes. When the cover member 500 and the base panel 100 are interconnected, they enclose a housing compartment 501 in which battery packs 2 can be arranged. When the cover member 500 and the base panel 100 are interconnected, a sealing means is arranged at the interfacial region between the cover member 500 and the base panel 100, such that the housing compartment is essentially hermetically sealed. Thus, intrusion and accumulation of water and/or other corrosion-enhancing substances into the housing compartment can be prevented. As indicated in FIG. 6 and shown in more detail in FIG. 7, the variation of a cover member 500 shown comprises a cover framework 510 which is partially made from a fiber reinforced plastic. In particular, the cover framework 510 is embodied as a sandwich structure, having cover sheets (not shown in detail) made from a fiber reinforced plastic and a panel core made from a foam structure arranged between the cover sheets. With such a variation of a cover member 500 a very lightweight and at the same time mechanically highly competent support structure 1 can be obtained.

Figure 7:
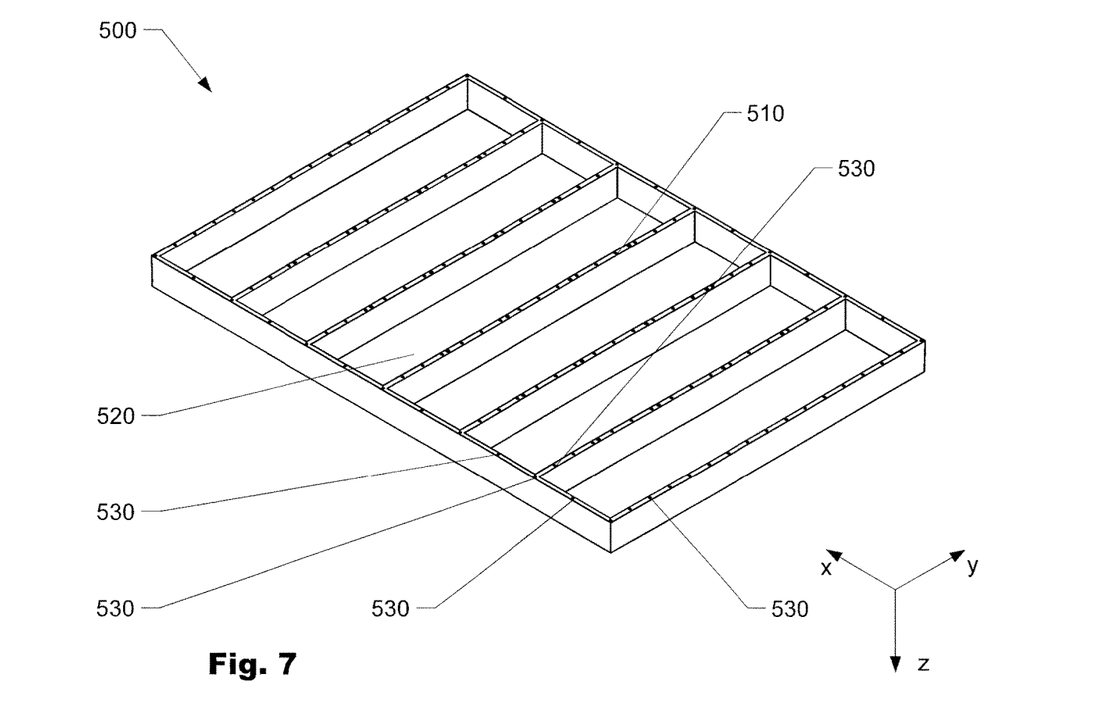
FIG. 7 the cover member of FIG. 6 in a perspective view from the bottom.

The cover framework 510 of the cover member 500 comprises a multiplicity of fastening points 530 that are threaded inserts arranged inside of the sandwich structure. Due to the relatively high number of fastening points 530, a mechanically very strong interconnection between the base plate 100 and the cover member 500 can be obtained, allowing a support structure 1 with a box structure to be obtained that is mechanically highly competent while having a low total weight. As shown, the support structure 1 together with a set of power packs forms a power module 700.

Figure 8:
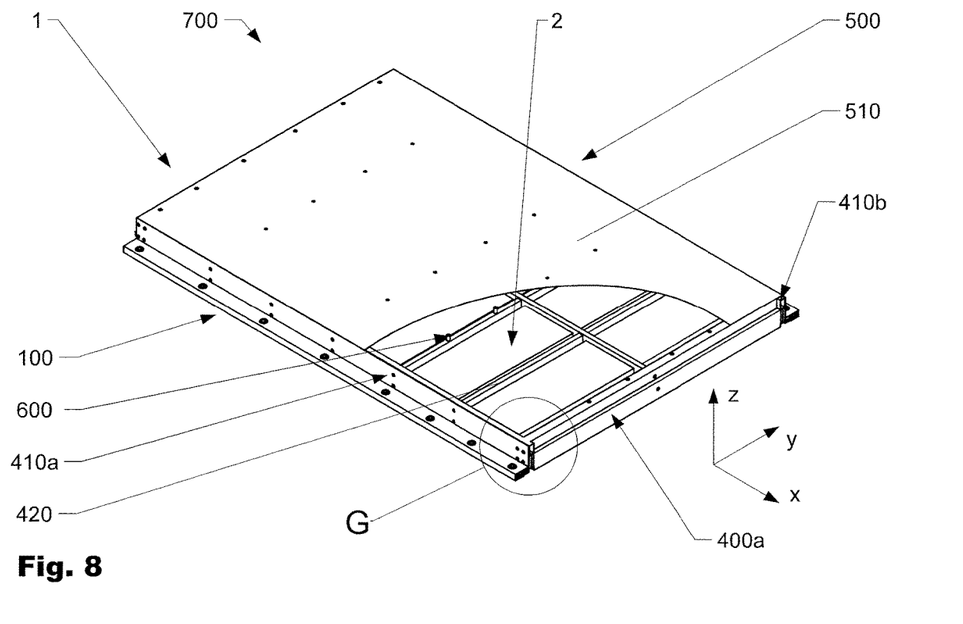
FIG. 8 a third variation of a support structure according to the present disclosure comprising a cover member, with a battery pack in a perspective view from above, part of a cover closure being clipped for illustrative purposes.
Figure 9:
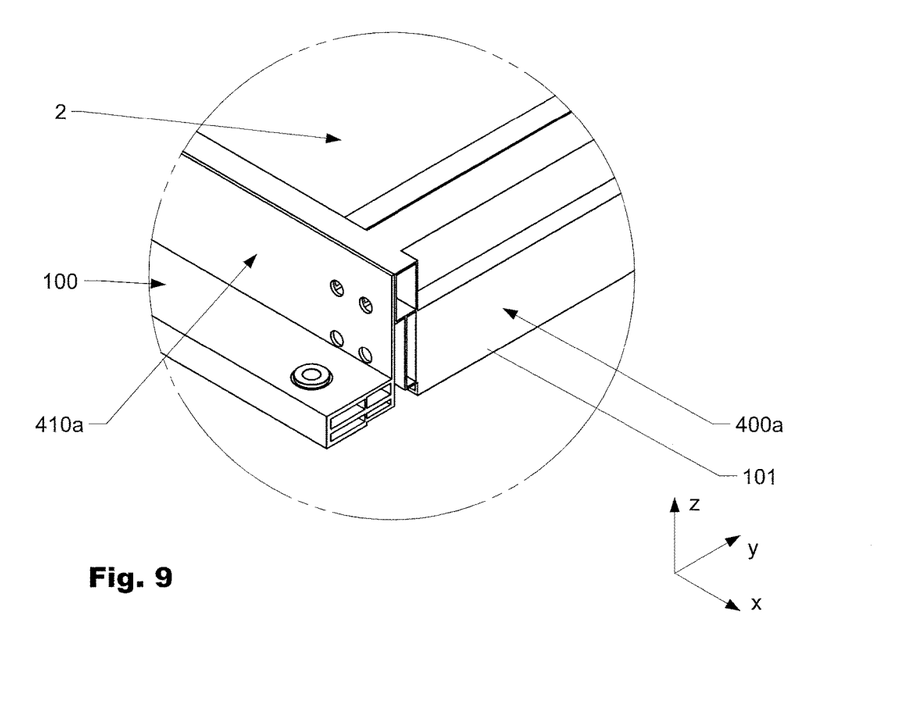
FIG. 9 detail G of FIG. 8.

FIGS. 8 and 9 show a variation of a support structure 1, respectively power module 700, that comprises a first auxiliary beam 410a and a second auxiliary beam 410b mechanically interconnected with and forming a frame with the first and the second main beam 400a, b. These main beams 400a,b, as well as the auxiliary beams 410a,b, comprise extruded profiles made from an aluminum alloy which are interconnected by means of fastening elements (not shown in detail). Between the first and the second main beams 400a,b, as well as between the first and the second auxiliary beams 410a,b, ribs 420 are arranged which increase the stiffness and strength of the support structure. On top of the frame formed by the main beams 400a,b and the auxiliary beams 410a,b, a cover closure 520 is arranged that, in the variation shown, is a glass fiber reinforced plastic sheet.

Figure 10:
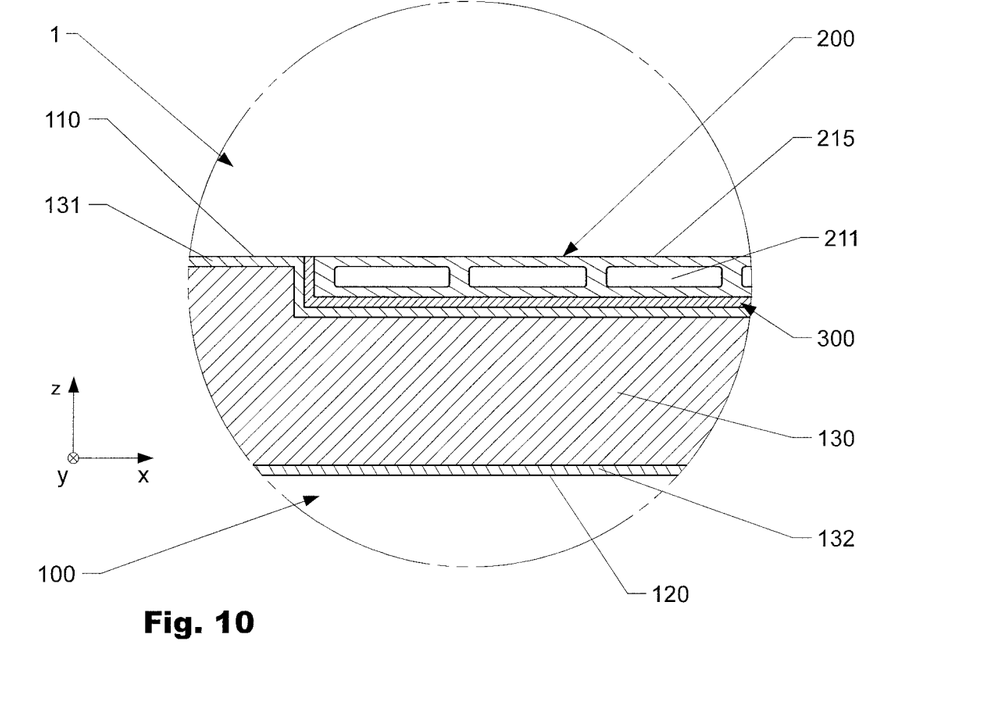
FIG. 10 a cross-section of a fourth variation of a support structure according to the present disclosure.

FIG. 10 shows a variation of a support structure 1 that comprises a base panel 100 that has a sandwich structure with a first cover sheet 131, a second cover sheet 132 and a panel core 130 arranged in-between. The panel core 130 of the variation shown is made from a polymethacrylimide (PMI) foam. The first and second cover sheets 131, 132 are made from fiber reinforced plastics comprising multiple layers of fibers. In the variation shown, the second cover sheet 132 comprises one layer of glass fibers that is arranged adjacent to the second surface 120. Thus, potentially critical mechanical impact to the base panel 100, e.g. due to debris, can be diagnosed by visual inspection. In addition, between the first surface 110 of the base panel 100 and the thermal transfer member 200, an intermediate layer 300 is arranged. The intermediate layer 300 of the variation shown in FIG. 10 is made from an elastic material that accommodates different coefficients of thermal expansion in the thermal transfer member 200 and the base panel 100. In addition, the variation of an intermediate layer 300 shown is electrically insulating, allowing electrochemical decoupling of the thermal transfer member 200 made from aluminum and the base panel 100 comprising carbon fibers. Thus, corrosion effects can efficiently be prevented.

Figure 11:
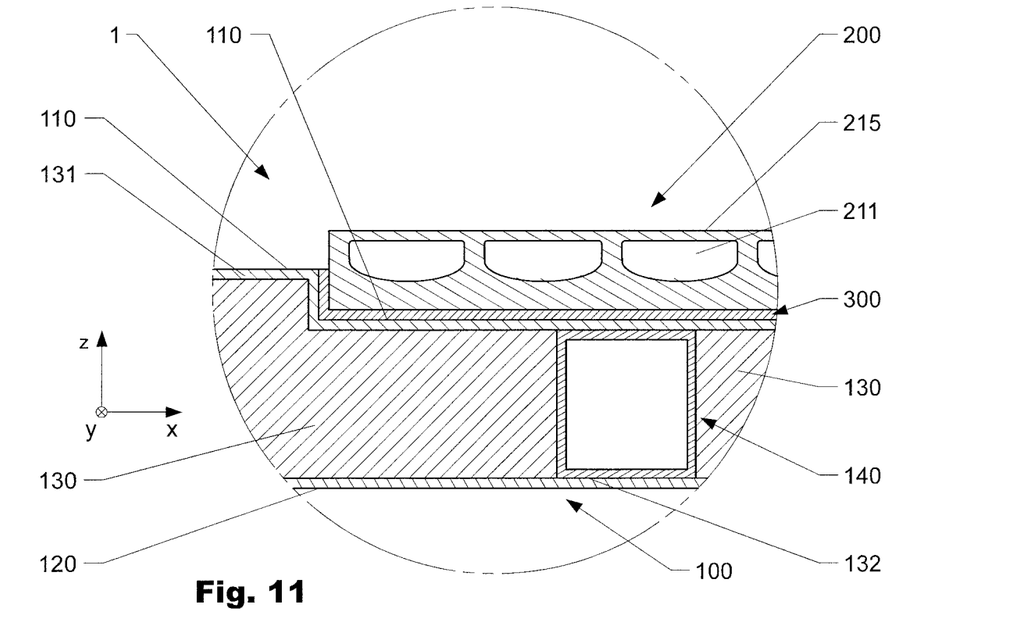
FIG. 11 a cross-section of a fifth variation of a support structure according to the present disclosure.

FIG. 11 shows a variation of a support structure 1 in which the base panel 100 comprises a panel core 130 that is augmented by monolithic beams 140. As also shown, the thermal transfer member 200 is only partly arranged in a recess in the first surface 110 of the base panel 100.

Figure 12:
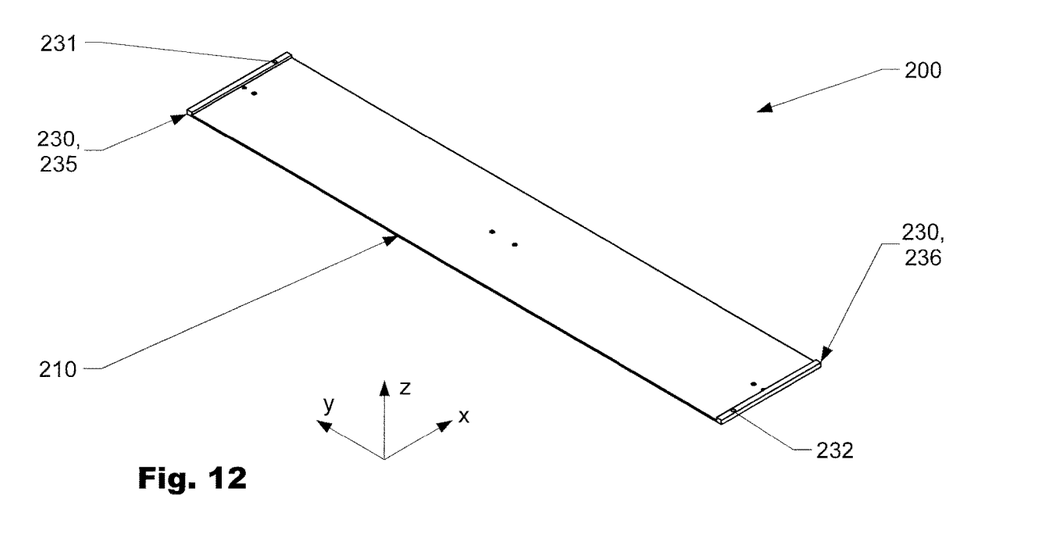
FIG. 12 a first variation of a thermal transfer member according to the present disclosure in a perspective view from above.
Figure 13:
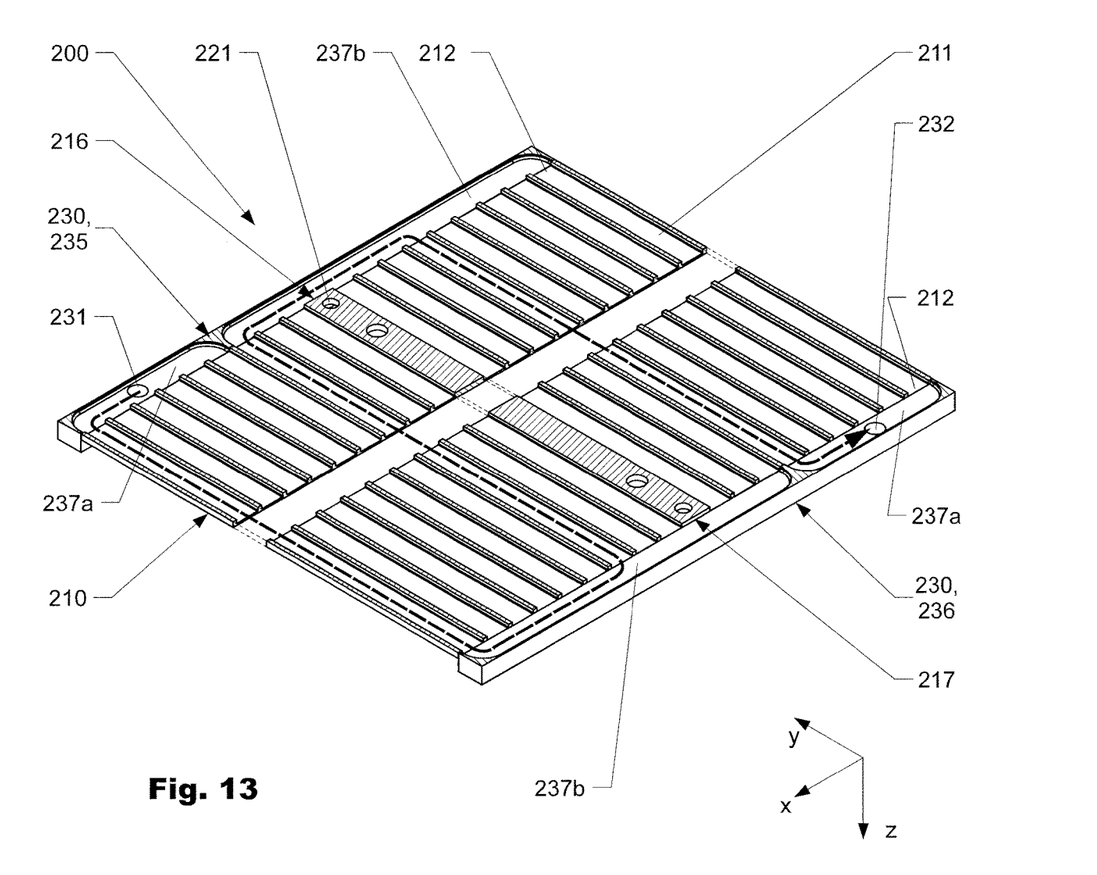
FIG. 13 the variation of a thermal transfer member of FIG. 12 in a perspective view from below, a part of the bottom as well as a part of the center of the thermal transfer member being clipped for illustrative purposes.

FIGS. 12 and 13 (clipped for illustrative purposes) schematically show a variation of a thermal transfer member 200 comprising a plate-like contacting unit 210 that has a contact face 215 configured to be brought into contact with a battery pack (not shown). The contacting unit 220 comprises a multiplicity of internal channels (not shown) that run in the y-direction. The variation of a thermal transfer member 200 shown further comprises a routing module 230 that comprises a first routing member 235 and a second routing member 236. In this variation, the first and the second routing member 235, 236 are essentially identical parts. The first routing member 235 is arranged at a first connection face 216 of the contacting unit 210. The second routing member 236 is arranged at a second connection face 217 of the contacting unit 210. The variation of the routing module 230 shown further comprises an inlet port 231 which, during operation of the thermal transfer member 200, will be interconnected with a fluid line (not shown) that provides coolant to the thermal transfer member 200 via the inlet port 231. In addition, the routing module 230 comprises an outlet port 232 which during operation of the thermal transfer member 200 will also be interconnected with a fluid line (not shown) to discharge coolant. As schematically shown in FIG. 13, the first and the second routing member 235, 236 each comprise a small routing cavity 237a and a big routing cavity 237b. When the routing members 235, 236 are interconnected with the contacting unit 210, as shown in FIG. 13, both routing cavities 237a,b are fluidically interconnected with multiple channel ports of the contacting unit 210. The big routing cavities 237b are both fluidically interconnected with 12 channel ports 212, wherein the small routing cavities 237a are interconnected with six channel ports 212. As indicated by the broken line, the routing members 235, 236 thus define the way that coolant flows through the internal channels of the contacting unit 210. In the variation shown, coolant provided to the inlet port 231 is distributed to the inlet ports 231 arranged at a first connection face 217 of the four internal channels 212 and flows via said channels 212 to the other channel ports 212 arranged at the second connection face 217 and to the big routing cavity 237b of the second routing member 236. As shown, the coolant subsequently flows from the big routing cavity 237b of the second routing member 236 via another set of internal channels 212 back to first routing member 235, where it enters the big routing cavity 237b and is routed to a third set of internal channels 212 via which the coolant flows to the small routing cavity 237a of the second routing member 236 and from there to the outlet port 232 to be discharged. In such a variation of a thermal transfer member 200, coolant flows at relatively low speed and hence laminar flow in the internal channels 212 can be obtained, leading to relatively low thermal transfer at the walls of the internal channels 212. Thus, lightweight low performance coolant pumps may be used, allowing a decrease in total vehicle weight for certain types of vehicles.

Figure 14:
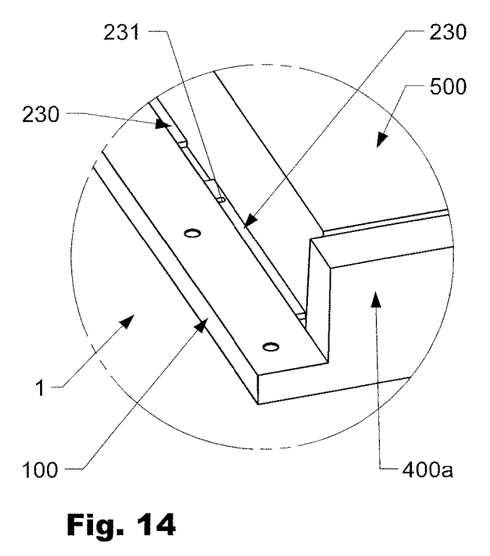
FIG. 14 a detail of the variation of a support structure of FIG. 6.
Figure 15:
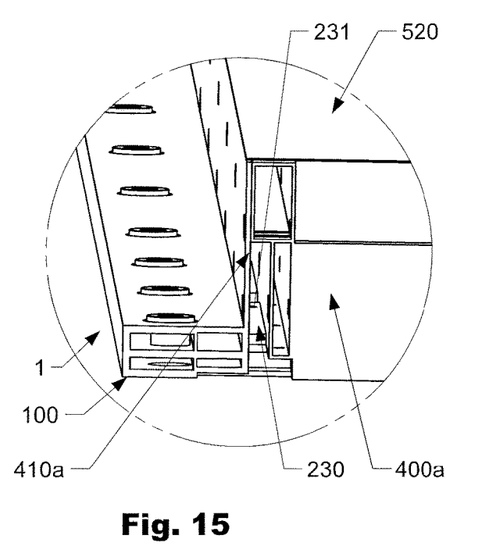
FIG. 15 a detail of the variation of a support structure of FIG. 8.

FIG. 14 shows a detail of the variation of support structure 1 according to FIGS. 6 and 7. FIG. 15 shows a detail of the variation of support structure 1 according to FIGS. 8 and 9. As can be seen in FIGS. 14 and 15, in both variations of a support structure 1, the thermal transfer members 200 are configured such that when the cover members 500 are interconnected with the base panels 100, the inlet ports 231 for coolant are arranged outside of the housing compartments. The same holds true for the outlet ports which are not visible in these Figures.

Figure 16:
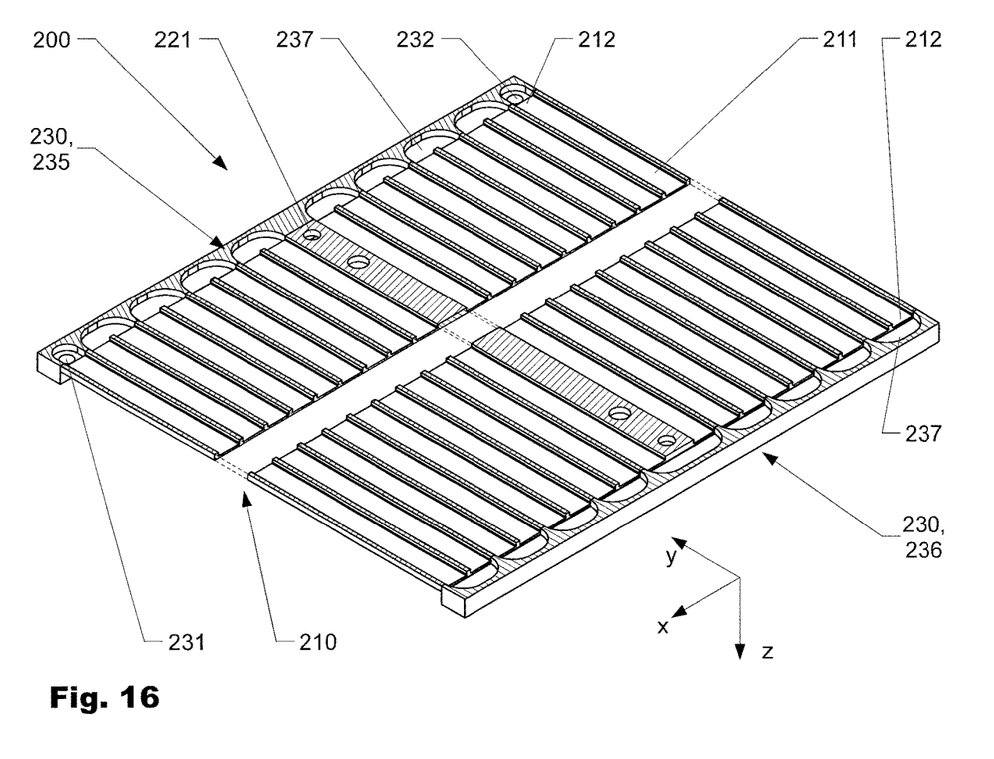
FIG. 16 a second variation of a thermal transfer member in a perspective view from below, a part of the bottom as well as a part of the center of the thermal transfer member being clipped for illustrative purposes.
Figure 17:
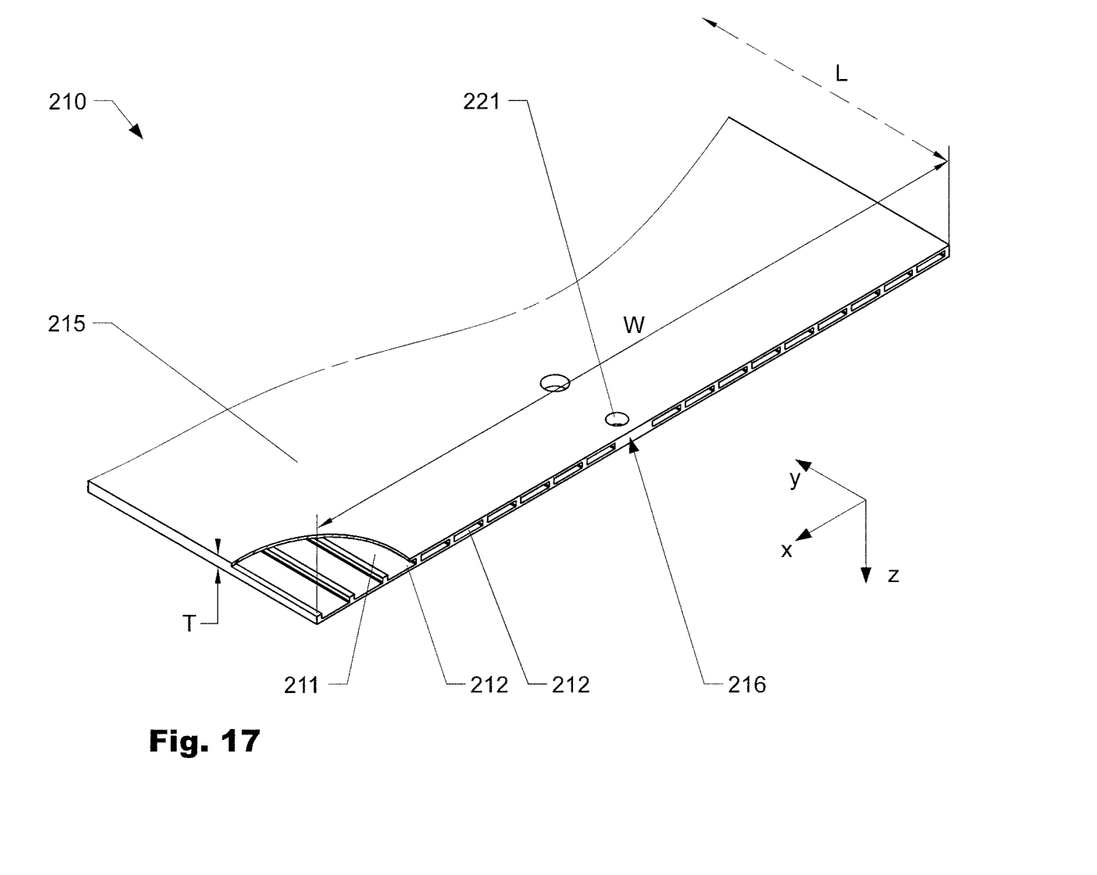
FIG. 17 a variation of a contacting unit according to the present disclosure.

FIG. 16 schematically shows a further variation of a thermal transfer member 200 according to the present disclosure. This routing module 230 of this variation comprises a first and a second routing member 235, 236 that again are arranged at the first, respectively second connection face 216, 217 of a contacting unit 210. Said routing members 235, 236 comprise multiple routing cavities 237 that are interconnected with a multiplicity of channel ports 212, respectively internal channels 211, in such a way that coolant (not shown) provided to the router inlet port 231 flows through the connecting unit 210 at a relatively high speed to the router outlet port 232. Thus, turbulent flow can be obtained in the internal channels 211 using the same type of contacting unit 210—which in this case is an extruded profile made from aluminum. A variation of such a contacting unit 210 is shown in more detail in FIG. 17, parts of the contacting unit 210 being clipped for illustrative purposes. As can be seen, said contacting unit 210 has a plate-like structure. The variation shown has a thickness T of about 4 mm [millimeter] and a width of about 250 mm and a length L of about 1200 mm. The contacting unit 210 comprises eighteen internal channels 211 connecting channel ports 212 arranged on a first connection face 216 and a second connection face (not visible) of the contacting unit 210. The internal channels 211 have an essentially rectangular cross-section with a height of about 2 mm and a width of about 11.5 mm.

The invention claimed is:

1. A support structure for an energy storage device in the form of a battery pack of a vehicle, comprising
   a. at least one base panel that has a first surface and a second surface and that is at least partially made from a composite material; and
   b. at least one thermal transfer member arranged on the first surface of the least one base panel, the at least one thermal transfer member comprising at least one contact face configured to be in thermal contact with at least part of the energy storage device to be mounted on the support structure, wherein an intermediate layer is arranged between the first surface and the thermal transfer member.

2. The support structure according to claim 1, wherein the at least one base panel is at least partially made from a fiber reinforced plastic.

3. The support structure according to claim 1, wherein the base panel comprises a layer of fibers adjacent to the first surface which comprises at least one of glass fibers and a layer of fibers adjacent to the second surface which comprises glass fibers.

4. The support structure according to claim 1, wherein the base panel comprises a sandwich-type panel comprising a panel core and a first cover sheet and a second cover sheet arranged on two opposite sides of the panel core.

5. The support structure according to claim 4, wherein the panel core comprises a cellular solid material.

6. The support structure according to claim 1, wherein the base panel comprises at least one insert that is at least partially arranged in the base panel and configured to be used as a fastening point.

7. The support structure according to claim 1, wherein the first surface of the base panel comprises a recess in which the at least one thermal transfer member is at least partially arranged.

8. The support structure according to claim 1, wherein the intermediate layer comprises an adhesive agent.

9. The support structure according to claim 1, wherein the intermediate layer is made from an elastic material.

10. The support structure according to claim 1, wherein the at least one thermal transfer member is plate-shaped.

11. The support structure according to claim 1, wherein the at least one thermal transfer member is at least partially made from a metal.

12. The support structure according to claim 1, wherein multiple thermal transfer members are arranged on the first surface of the base panel.

13. The support structure according to claim 1, wherein the at least one thermal transfer member comprises at least one internal channel configured to receive and convey a coolant.

14. The support structure according to claim 13, wherein the at least one internal channel is configured such that turbulent flow of the coolant is obtained, when the coolant is moved in the at least one internal channel.

15. The support structure according to claim 1, wherein at least one main beam is mechanically interconnected with the base panel.

16. The support structure according to claim 15, wherein the base panel has a rectangular shape and comprises a first main beam mechanically interconnected with and extending along a first edge area of the base panel and a second main beam mechanically interconnected with and extending along a second edge area of the base panel.

17. The support structure according to claim 15, wherein at least one main beam is an integral part of the base panel.

18. The support structure according to claim 15, wherein the at least one main beam is a separately produced part that is mechanically interconnected with the base panel.

19. The support structure according to claim 18, wherein the at least one main beam comprises an extruded profile made from a metal or from a short fiber reinforced plastic.

20. The support structure according to claim 16, further comprising a first auxiliary beam and a second auxiliary beam mechanically interconnected with and forming a frame with the first main beam and the second main beam.

21. The support structure according to claim 20, wherein at least one rib is arranged between the first main beam and the second main beam and/or between the first auxiliary beam and the second auxiliary beam.

22. The support structure according to claim 1, further comprising at least one cover member releasably mechanically interconnected with the base panel and enclosing at least one housing compartment configured to receive at least one energy storage device.

23. The support structure according to claim 22, wherein the at least one cover member comprises a cover framework made at least partially from a fiber reinforced plastic.

24. The support structure according to claim 22, wherein the at least one cover member comprises a cover closure made from a fiber reinforced plastic.

25. The support structure according to claim 22, wherein the thermal transfer member comprises at least one inlet port and at least one outlet port interconnected with each other via at least one internal channel, the at least one inlet port and the at least one outlet port being arranged outside of the at least one housing compartment.

26. The support structure according to claim 22, further comprising at least one passage that extends from the second surface of the base panel via the base panel to a first surface of the at least one cover member.

27. A thermal transfer member for the support structure according to claim 1, comprising
   a. a contacting unit comprising
      i. a contact face configured to be brought into contact with the energy storage device and
      ii. a multiplicity of internal channels arranged inside of the contacting unit, each internal channel fluidically interconnecting at least two channel ports arranged at the surface of the contacting unit; and
   b. a routing module
      i. having at least one inlet port configured to receive a thermal transfer fluid and at least one outlet port configured to dispense the thermal transfer fluid and
      ii. the routing module being fluidically interconnected with the at least two channel ports of the multiplicity of internal channels whereby
      iii. the routing module defines at least one fluidic pathway that fluidically interconnects the at least one inlet port of the routing module with the at least one outlet port of the routing module via at least one of the multiplicity of internal channels.

28. The thermal transfer member according to claim 27, wherein a first fraction of the at least two channel ports is arranged at a first connection face and a second fraction of the at least two channel ports is arranged at a second connection face of the contacting unit and wherein the routing module comprises first routing member and a second routing member, the first routing member being arranged at the first connection face and being fluidically interconnected with the first fraction of the at least two channel ports and the second routing member being arranged at the second connection face and being fluidically interconnected with the second fraction of the at least two channel ports.

29. The thermal transfer member according to claim 27, wherein the contacting unit comprises a plate-like structure.

30. The thermal transfer member according to claim 27, wherein the contacting unit is an extruded profile.

31. The thermal transfer member according to claim 27, wherein the contacting unit and the routing module are integrally made.

32. The thermal transfer member according to claim 27, wherein the routing module comprises at least one routing cavity that is fluidically interconnected with the at least two channel ports when the routing module is interconnected with the contacting unit.

33. A method to produce the support structure according to claim 1, comprising the method steps of
   a. providing a tool;
   b. applying layers of fibers to the tool;
   c. applying at least one thermal transfer member to the layers of fibers; and
   d. bonding the fibers by a resin to form a composite material.

34. The method according to claim 33, comprising the step of applying an intermediate layer between the layers of fibers and the at least one thermal transfer member.

35. A power module comprising the support structure according to claim 1 and the energy storage device arranged at the support structure.

36. The power module according to claim 35, wherein the energy storage device is the battery pack.

37. An electric vehicle comprising the support structure according to claim 1.

\* \* \* \* \*